July 21, 1959  E. E. PRICE  2,895,374
STEREO-OPTICAL SYSTEM
Filed Sept. 14, 1954  2 Sheets-Sheet 1

Edgar E. Price

July 21, 1959  E. E. PRICE  2,895,374
STEREO-OPTICAL SYSTEM
Filed Sept. 14, 1954  2 Sheets-Sheet 2

Edgar E. Price

United States Patent Office 2,895,374
Patented July 21, 1959

2,895,374
STEREO-OPTICAL SYSTEM

Edgar E. Price, Norfolk, Va., assignor of one-tenth to James R. Forman, Fairfax County, Va., and one-tenth to Don C. Glassie, Montgomery County, Md.

Application September 14, 1954, Serial No. 455,860

13 Claims. (Cl. 88—16.6)

This invention relates to new and improved optical systems, and more particularly to an improved stereo-optical device.

The system comprising this invention makes possible the taking of pictures on a film or the projecting of pictures from a film wherein the two images of a stereoscopic image pair are located on either side of a dividing line which is parallel to the stereoscopic base line of the stereo-optical device. Incorporated with a motion picture camera or projector, the instant invention enables the production of stereo motion pictures having a wide screen format not unlike those presently used in conventional wide screen motion pictures. For example, the standard screen format has a height-to-width ratio of 3 to 4, or stated otherwise, the width is 1.33 times the height. However, by adopting the teachings of the present invention wherein a film frame is divided in half by a horizontal line with one stereo image above the line and one below, the height-to-width ratio of a composite image as seen on a screen would be 3 to 8; i.e., the width would be 2.66 times the height.

It is therefore an object of this invention to provide apparatus comprising in combination, plane reflecting surfaces, plane partially-transmitting and partially-reflecting surfaces and such other elements as will permit the employment of said plane reflecting surfaces and plane partially-transmitting and partially-reflecting surfaces as an optical assembly, herein referred to as a stereo-optical device, for a camera or for a projector whereby the functioning of the optical system of said camera or projector may be modified to permit use of said camera or projector as a stereocamera or stereoprojector respectively.

Another object of the invention is to provide apparatus and more particularly a stereo-optical device which is simple in design and can be used in combination with a still or motion picture camera and projector to take and subsequently project still or motion pictures which when properly viewed rigorously provide the necessary and sufficient optical conditions for true stereoscopic perception by an observer having the innate subjective faculty of depth perception through binocular vision.

Another object of the invention is to provide apparatus, and more particularly a stereo-optical device, for a camera having a single objective lens whereby symmetrical, contiguous and coplanar stereoscopically dissimilar image pairs may be formed in the plane of the film or plate of said camera when photographing a three-dimensional object, the said stereoscopically dissimilar image pairs being stereoscopically dissimilar to the same extent as image pairs formed by separate but identical objective lenses having substantially parallel and coplanar optic axes and separated by a distance approximately the same as the interocular spacing of a human observer.

Another object of the invention is to provide apparatus, and more particularly a stereo-optical device, for a camera having a single objective lens whereby in the plane of the film or plate of said camera may be formed symmetrical, contiguous and coplanar stereoscopically dissimilar image pairs having a minimal reduction in image quality as compared to the image quality of a single image formed by the single objective lens of said camera when photographing a three-dimensional object without the stereo-optical device attached.

Still another object of the invention is to provide apparatus, and more particularly a stereo-optical device, for a still or motion picture camera having a single objective lens whereby symmetrical, contiguous and coplanar stereoscopically dissimilar image pairs having either no keystone distortion or identical keystone distortion may be formed in the plane of the film or plate of said camera when photographing a three-dimensional object.

A further object of the invention is to provide apparatus, and more particularly a stereo-optical device, for a projector having a single projection lens whereby symmetrical, contiguous and coplanar stereoscopically dissimilar stereograms located in the image plane of the projector may be optically projected into stereoscopic coincidence on a suitable viewing screen.

Another object of the invention is to provide apparatus, and more particularly a stereo-optical device, for a motion picture camera having a single objective lens whereby symmetrical, contiguous, and coplanar stereoscopically dissimilar image pairs having approximately the same ratio of width to height as the conventional motion picture frame shape may be formed in the image plane of a single objective lens and be photographically recorded on a single strip of motion picture film.

A still further object of the invention is to provide apparatus, and more particularly a stereo-optical device, for a motion picture camera having a single objective lens whereby symmetrical, contiguous, and coplanar stereoscopically dissimilar image pairs having approximately twice the ratio of width to height as the conventional motion picture frame shape may be formed in the image plane of the single objective lens of said motion picture camera and be photographically recorded on a single strip of motion picture film.

Still another object of the invention is to provide apparatus, and more particularly a stereo-optical device for a still or motion picture camera having two suitably placed identical objective lenses whereby symmetrical, contiguous and coplanar stereoscopically dissimilar image pairs having either no keystone distortion or identical keystone distortion may be formed in the plane of the film or plate of said camera when photographing a three-dimensional object without the necessity for positioning the camera in any different way than would be necessary when photographing the same object with a camera having a single objective lens being used to obtain a single two-dimensional photograph of the object.

Other objects and many of the attendant advantages of this invention will be readily appreciated as the same becomes better understood by reference to the following detailed description when considered in connection with the accompanying drawings wherein.

The operation of the stereo-optical device depends upon the optical properties of plane and roof reflecting surfaces. A plane reflecting surface causes what is commonly referred to as image reversal. Thus the reflection of a printed page appears to have the printing reversed from left to right when viewed after reflection by a plane mirror, placed perpendicular to the direction of the lines of type. A roof reflector produces image reversal, just as does a plane reflecting surface, but in addition causes image inversion. Thus the reflection of a printed page appears to have the printing upside down as well as reversed from left to right when viewed after successive reflections by both surfaces of a roof reflector placed with the roof edge perpendicular to the page and with the line of intersection of each roof surface with the page at an angle of 45° with the lines of type.

The optical action of both forms of stereo-optical device shown in Figs. 1, 2, 3 and 4 is to combine in an image plane two images having stereoscopic dissimilarity in which one image is inverted with respect to the other by the optical action of a roof reflector and corresponding parts of both images are prevented from overlapping in the image plane by the proper placement of a mask.

If the mask were not present when the stereo-optical device is used with a camera, two superimposed but vertically oppositely oriented images would be formed in the plane of the film. The mask prevents overlapping by reducing the vertical size of each image to one-half normal. The image inversion produced by the objective roof reflector permits both images corresponding to those seen by right and left eyes to be contiguous and symmetrical except for stereoscopic dissimilarity about a horizontal line in the plane of the film and intersecting the optic axis of the objective lens.

Figure 1:
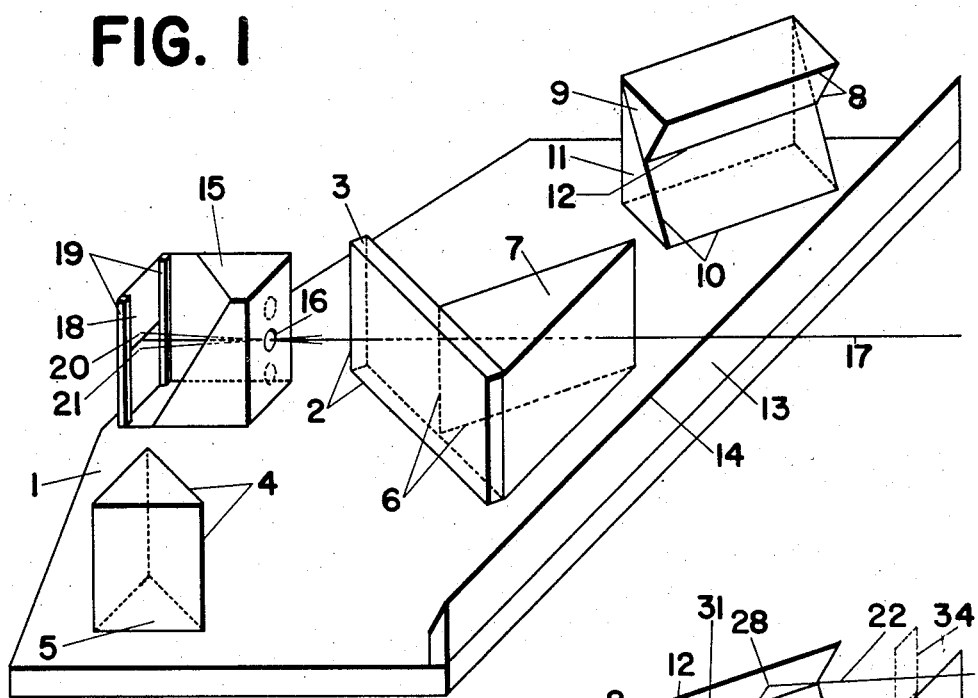
Fig. 1 is a perspective view of a device embodying one form of the invention.

With reference more particularly to Fig. 1 of the drawings, there is shown a perspective view of one embodiment of the invention which may be used either in connection with taking or projecting stereoscopic image pairs. The various optical elements comprising the stereo-optical device are supported on a base. Base 1 is flat and for purposes of this description is assumed to lie in a horizontal plane. All elements comprising the stereo-optical device or stereo-optical attachment and cooperating assemblies are firmly fixed to the base 1 so that in taking pictures it is not necessary that base 1 be kept in a horizontal plane. The stereo-optical device comprises, in addition to base 1, a lens, a film gate, one partially-transmitting partially-reflecting plane surface, four totally-reflecting plane surfaces, suitable supporting members, and a mask. The plane partially transmitting partially-reflecting collimating surface 2 is supported on one surface of glass plate 3, having two plane parallel polished flat surfaces. Laterally displaced plane objective reflecting surface 4 is supported on a polished plane surface of glass prism 5. Centrally located plane reflecting surface 6 is supported on a polished plane surface of glass prism 7. Totally-reflecting plane inverting roof objective surfaces 8 and 10 are supported on polished plane surfaces of glass prisms 9 and 11 respectively. Line 12 is the intersection line of totally-reflecting plane inverting roof objective surfaces 8 and 10. The mask 13 having upper edge 14 is also firmly fixed to base 1. The stereo-optical device includes and the stereo-optical attachment cooperates with 15 which represents a means for supporting a lens 16 having an optic axis 17 and a film 18 positioned within means providing a film gate 19.

The directions right and left in this description are those of the right and left hands of an observer standing upright and positioned on that side of the film away from the lens and facing toward the lens. The directions clockwise and counterclockwise refer to these directions for a clock placed face upward at the feet of such an observer. Numerals 20 and 21 represent points on the film lying on either side of that horizontal line on the film which intersects the optic axis of the lens 16 and which in projection, gives rise to the axial rays.

Numeral 20 may be assumed to be any point in the image corresponding to that as seen by the left eye and 21 may be assumed to be any point in the image corresponding to that as seen by the right eye. Numeral 22 will be deemed representative of the bundle of rays originating from or going to the point 20. Numeral 23 will be deemed representative of the bundle of rays originating from or going to the point 21.

The partially-transmitting partially-reflecting plane surface 2 supported by glass plate 3 is positioned vertically on that side of the objective lens 16 away from the film 18 positioned within film gate 19 and intersects the optic axis 17 of objective lens 16 at such an angle that rotation of the optic axis 17 through an angle of 45° clockwise about a vertical line intersecting optic axis 17 in partially-transmitting partially-reflecting plane surface 2 would be required to bring the optic axis 17 into the plane of partially-transmitting partially-reflecting plane surface 2.

Laterally displaced plane objective reflecting surface 4 supported on a surface of glass prism 5 is positioned to be parallel to partially-transmitting partially-reflecting plane surface 2 but is displaced laterally to the right of the point of intersection of the optic axis 17 of the lens 16 with partially-transmitting partially-reflecting plane surface 2 by an amount equal to one-half the desired interocular separation for the left and right images.

Centrally located plane reflecting surface 6 supported on one surface of glass prism 7 is positioned vertically on that side of the objective lens 16 and of the partially-transmitting partially-reflecting plane surface 2 and its supporting glass plate 3 which is away from the film 18 positioned within film gate 19. Centrally located plane reflecting surface 6 intersects the optic axis 17 of lens 16 at an angle such that rotation of the optic axis 17 through an angle of 45° counterclockwise about a vertical line intersecting optic axis 17 in centrally located plane reflecting surface 6 would be required to bring the optic axis 17 into the plane of centrally located plane reflecting surface 6.

Totally-reflecting plane inverting roof objective surfaces 8 and 10 supported on surfaces of glass prisms 9 and 11 respectively are positioned with respect to each other in such a manner that the angle between them is 90° and the line of intersection 12 is horizontal. The orientation of this combination of totally-reflecting plane inverting roof objective surfaces is such that each makes a minimum angle of 45° with a vertical line intersecting their horizontal line of intersection 12. The angular position of this combination about said vertical line intersecting the horizontal line of intersection 12 is such that a rotation of 45° clockwise would be required to bring line of intersection 12 to a position of parallelism with optic axis 17 of lens 16. The combination of totally-reflecting plane inverting roof objective surfaces 8 and 10 supported on surfaces of glass prisms 9 and 11 is laterally displaced to the left of the point of intersection of optic axis 17 of the lens 16 with centrally located plane reflecting surface 6 by an amount equal to one-half the desired interocular separation for the left and right images. The combination of totally-reflecting plane inverting roof objective surfaces 8 and 10 as described in this paragraph will in some instances hereinafter be referred to as "the objective roof reflector."

A mask 13 is placed on that side of the reflecting elements of the stereo-optical device away from the lens 16. The upper edge 14 of mask 13 is horizontal and so positioned vertically that a horizontal plane can be located that will contain upper edge 14 of mask 13, line of intersection 12 of totally-reflecting plane inverting roof objective surfaces 8 and 10, and the optic axis 17 of lens 16.

Figure 2:
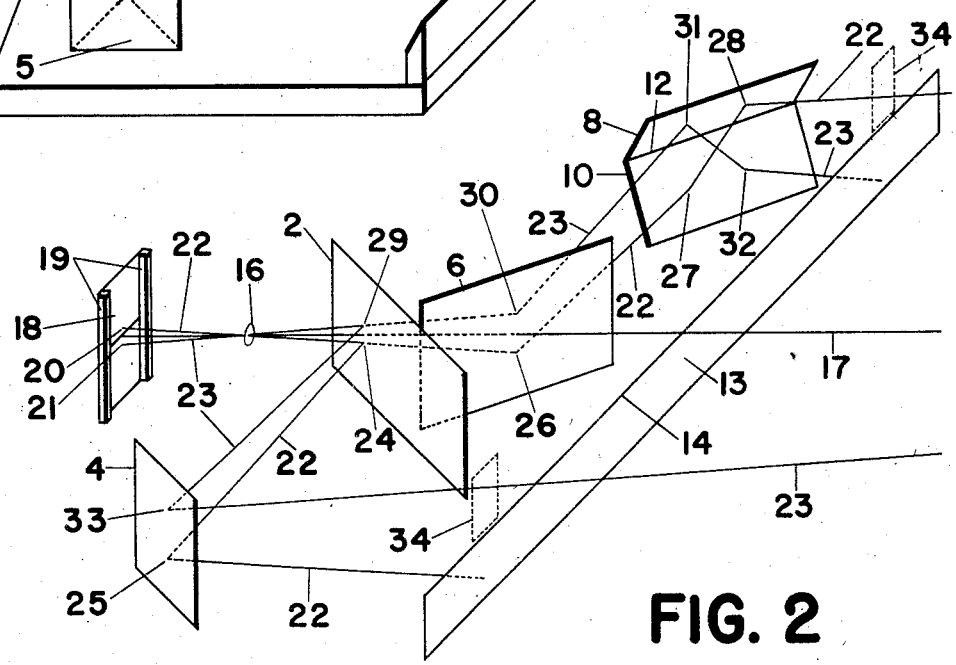
Fig. 2 is a diagrammatic representation in perspective of the paths taken by rays forming each of the stereoscopic images transmitted through the device of Fig. 1.

The path taken in projection by the rays 22 may be seen by referring to Fig. 2. The left eye stereoscopic image is impressed on these rays by the film 18 at point 20. The rays 22 then pass through the lens 16, are partially-transmitted and partially-reflected by partially-transmitting partially-reflecting plane surface 2 at point 24. The reflected portion of rays 22 is reflected again by laterally displaced plane objective reflecting surface 4 at point 25 and strikes below the edge 14 of mask 13 and is absorbed or otherwise deflected and lost. The portion of rays 22 transmitted by partially-transmitting partially-reflecting plane surface 2 at point 24 is reflected again by centrally located plane reflecting surface 6 and by totally-reflecting plane inverting roof objective surfaces 10 and 8 at points 26, 27 and 28 respectively and passes to the screen above edge 14 of mask 13. The image represented by rays 22 is upright on the film 18, is rotated 180° about the optic axis 17 by passage through lens 16, and is inverted by the successive reflections within the objective roof reflector from totally-reflecting plane inverting roof objective surfaces 10 and 8 respetcively, so that it appears upright on the screen.

The path taken in projection by the rays 23 may also be seen by referring to Figure 2. The right eye stereoscopic image is impressed on these rays by the film 18 at point 21. The rays 23 then pass through the lens 16, and are partially-transmitted and partially-reflected by partially-transmitting partially-reflecting plane surface 2 at point 29. The transmitted portion of rays 23 is reflected again by centrally located plane reflecting surface 6 and by totally-reflecting plane inverting roof objective surfaces 8 and 10 at points 30, 31 and 32 respectively and strikes below the edge 14 of mask 13 and is absorbed or otherwise lost. The portion of rays 23 reflected by partially-transmitting partially-reflecting plane surface 2 at point 29 is reflected again by laterally displaced plane objective reflecting surface 4 at point 33 and passes to the screen above edge 14 of mask 13.

Both rays 22 and 23 may traverse suitable polarizing elements 34 adapted to impart predeterminedly differing polarization characteristics to each beam.

Figure 3:
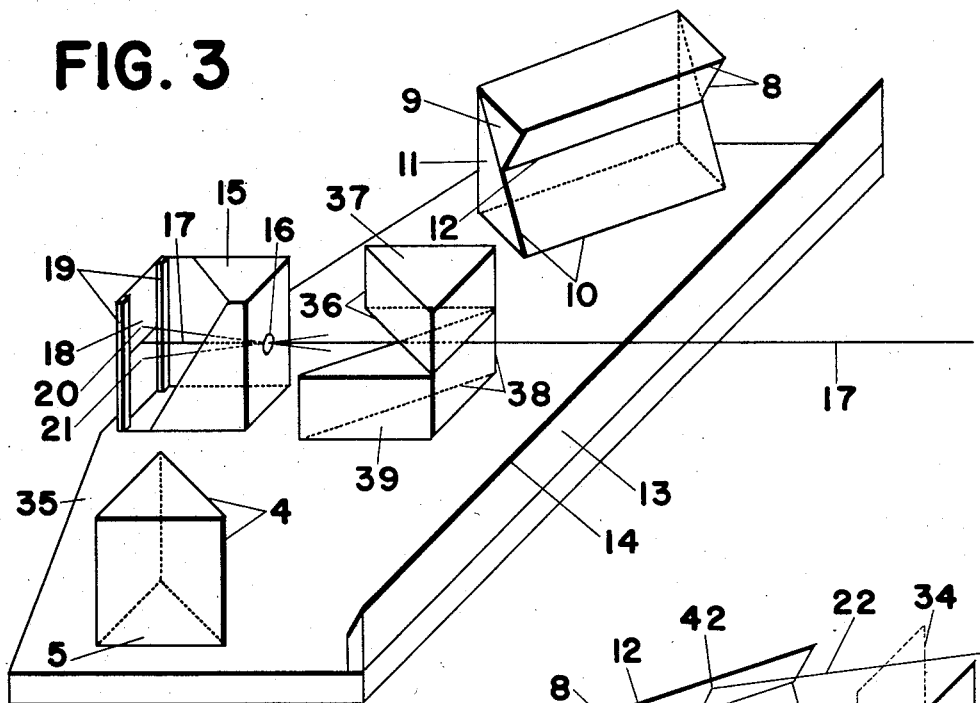
Fig. 3 is a perspective view of a modification of the structure shown in Fig. 1.

In another embodiment shown in Fig. 3 the stereo-optical device may comprise a lens, film gate and five plane-reflecting surfaces, all of which are totally-reflecting surfaces. Base 1 is replaced by base 35 which is somewhat smaller than base 1. Partially-transmitting partially-reflecting plane surface 2 is replaced by above axis centrally located plane-reflecting surface 36 lying in the same plane as partially-transmitting partially-reflecting plane surface 2, but extending only in the upward direction from a horizontal plane including the optic axis 17 of lens 16. Above axis centrally located plane-reflecting surface 36 is supported on a polished plane surface of prism 37. Centrally located plane-reflecting surface 6 is replaced by below axis centrally located plane-reflecting surface 38 which is parallel to the plane of centrally located plane reflecting surface 6 and extends only in a direction downward from a horizontal plane including the optic axis 17 of lens 16. Below axis centrally located plane reflecting surface 38 is located closer to the lens 16 than centrally located plane reflecting surface 6 which it replaces. Below axis centrally located plane reflecting surface 38 is so located that a vertical line lying in both above and below axis centrally located plane reflecting surfaces 36 and 38 will intersect the optic axis 17 of lens 16. The objective roof reflector comprising the combination of totally-reflecting plane inverting roof objective surfaces 8 and 10 together with their supporting prisms 9 and 11 respectively are also moved to a position having the same location with respect to below axis centrally located plane reflecting surface 38 as they previously had with respect to centrally located plane reflecting surface 6.

Figure 4:
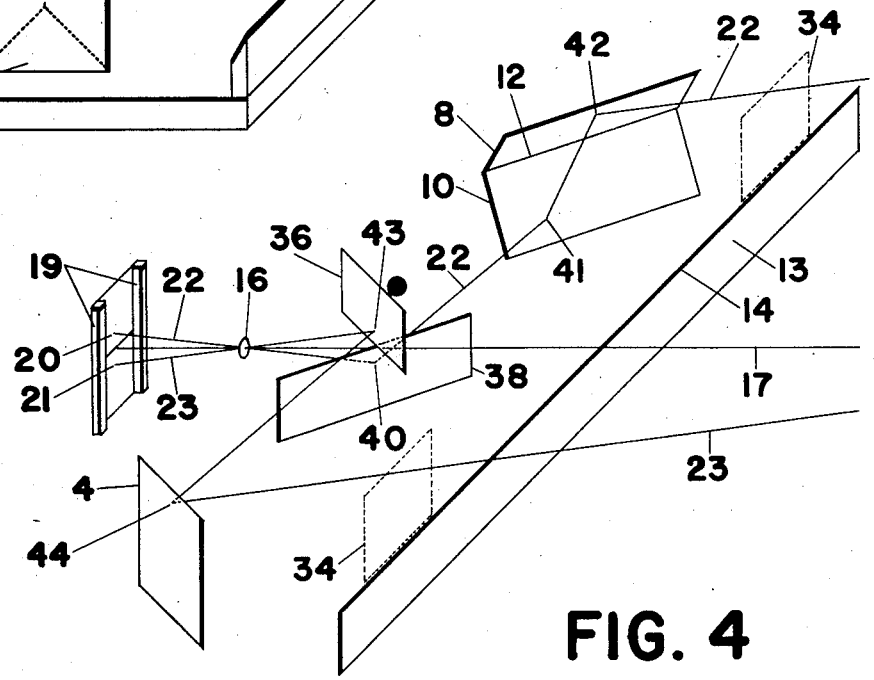
Fig. 4 is a diagrammatic representation in perspective of the paths taken by rays forming each of the stereoscopic images transmitted through the device of Fig. 3.

In the modification of stereo-optical device shown in Fig. 3 the path taken in projection by the rays 22 may be seen by referring to Fig. 4. The left eye stereoscopic image is impressed on these rays by the film 18 at point 20. The rays 22 then pass through the lens 16 and are totally reflected by below axis centrally located plane reflecting surface 38 at point 40, by totally-reflecting plane inverting roof objective surfaces 10 and 8 at points 41 and 42 respectively, and pass to the screen above edge 14 of mask 13. The image represented by rays 22 is upright on the film 18, is rotated 180° about the optic axis 17 by passage through lens 16, and is inverted by the reflections within the objective roof reflector from totally-reflecting plane inverting roof objective surfaces 10 and 8 respectively so that it appears upright on the screen.

In the modification of stereo-optical device shown in Fig. 3 the path taken in projection by the rays 23 may be seen by referring to Fig. 4. The right eye view of a stereoscopic image is impressed on these rays by the film 18 at point 21. The rays 23 then pass through the lens 16 and are totally reflected by above axis centrally located reflecting surface 36 at point 43, by laterally displaced plane objective reflecting surface 4 at point 44, and pass to the screen above edge 14 of mask 13.

As described above the angular relations of the reflecting surfaces are such that the image-carrying axial beams converge at infinity. Adjustments in the angular positions of one or all of the reflecting surfaces may be made to produce convergence of the image-carrying axial beams at any desired finite distance from the stereo-optical device.

Although the description of Figures 1, 2, 3 and 4 has been in connection with the projection of stereoscopic images, it will be obvious that the systems there shown may be employed in the taking of stereoscopic pictures.

From the foregoing detailed description of Figs. 1, 2, 3 and 4 it can be seen that only that portion of an object lying above the optic axis 17 of lens 16 will appear in the stereoscopic images. Thus if it is desired to photograph a person standing up and have the full figure show in the picture it will be necessary to place the camera and stereo-optical device below the level of the feet of the person to be photographed. This position of camera and lens stereo-coefficient relative to the subject will permit elimination of keystone distortion. The camera version of the stereo-optical device can be held at waist level and tipped downward to permit the subject to be photographed from head to foot. If this is done, keystone distortion will result, but will be identical in both images corresponding to those seen by left and right eyes.

It is possible to construct a camera version of the stereo-optical device having two identical objective lenses spaced vertically apart, as shown by dotted lines above and below lens 16 in Fig. 1. For such use no modification to the stereo-optical device reflecting elements is necessary from either form described herein. If such a combination is used, a standing human subject can be photographed from head to foot without keystone distortion by holding the stereocamera horizontal at waist level of the subject.

As described and shown in Figs. 1 and 3 the reflecting surfaces are described as being front surface reflecting surfaces. A stereo-optical device can be constructed in which the reflection surfaces are the hypotenuses of 45° prisms and the roof-reflecting surfaces are contained in a roof prism. Such an arrangement is optically less desirable than the arrangements described and illustrated herein because distortions are introduced by such prisms.

As described and shown in Figs. 1 and 3 all reflecting surfaces except partially-transmitting partially-reflecting plane surface 2 are supported by prisms. This has been done because it is a possible way of constructing a stereo-optical device in which sufficient accuracy of placement among elements can be achieved.

Optical elements shown in contact with other optical elements can be fixed in position by optical cement. Similarly, by proper choice of the base material the optical elements can be held to the base by suitable cement. Thus Figs. 1 and 3 represent both diagrams showing the essential surfaces which comprise two forms of stereo-optical device and also possible practical methods of constructing stereo-optical devices.

Obviously many modifications and variations of the present invention are possible in the light of the above teachings. It is therefore to be understood that within the scope of the appended claims the invention may be practiced otherwise than as specifically described.

What is claimed is:

1. An optical system for forming on a film or projecting into a stereoscopic coincidence from a film stereoscopically dissimilar image pairs inverted with respect to each other about an imaginary line located in the film and in a plane perpendicular to the film which plane contains the line along which may be measured the distance between elements in the system which determines the amount of stereoscopic dissimilarity in the image pairs; comprising a film gate; optical image forming means positioned with respect to the film to form or project said image pairs; a plurality of reflecting surfaces located on that side of the said optical image forming means away from said film gate arranged to receive light rays corresponding to each point in the image pairs, to cause the light rays corresponding to each point in one of the image pairs to be displaced by an amount and in a direction to provide part of the stereoscopic dissimilarity between the image pairs, and to cause light rays corresponding to each point in the other of the image pairs to be displaced by an amount and in a direction to provide the remaining part of the stereoscopic dissimilarity between the image pairs, and additionally to cause light rays corresponding to each point in the other of the image pairs to be symmetrically transposed or inverted from one side to the other of said plane perpendicular to the film, said plurality of reflecting surfaces comprising a combination of two plane reflecting surfaces immediately adjacent to said optical image forming means, a laterally displaced plane objective reflecting surface, and a laterally displaced objective roof reflector, the directions of lateral displacement being along suitably located lines in the plane perpendicular to the film and containing said imaginary line located in the film; an opaque mask located on that side of the plurality of reflecting surfaces away from the image forming means and adapted to absorb or deflect light rays corresponding to those points in each image which would otherwise be superimposed upon each other; and means comprising suitably placed polarizing elements by which predetermined polarization characteristics may be imparted to the light rays corresponding to each of said image pairs.

2. An optical system for forming on a film or projecting into stereoscopic coincidence from a film stereoscopically dissimilar image pairs inverted with respect to each other about an imaginary line located in the film and in a plane perpendicular to the film which plane contains the line along which may be measured the distance between elements in the system which determines the amount of stereoscopic dissimilarity in the image pairs; comprising a film gate; optical image forming means positioned with respect to the film to form or project said image pairs; a plurality of reflecting surfaces located on that side of the said optical image forming means away from said film gate comprising two plane reflecting surfaces the planes of which are each perpendicular to the other and each perpendicular to the plane containing said imaginary dividing line and perpendicular to the film, said two plane reflecting surfaces being each at an angle of 45° to the plane of the film and having positions and configurations to receive beams of light corresponding to each point in the said image pairs and rotate beams representative of corresponding points in each of said image pairs oppositely through angles of 90° about a line perpendicular to said plane containing the imaginary dividing line and perpendicular to the film; said plurality of reflecting surfaces comprising additionally means providing a laterally displaced plane objective reflecting surface the plane of which is perpendicular to the plane containing said imaginary dividing line and perpendicular to the film, said laterally displaced plane objective reflecting surface being displaced laterally from said two plane reflecting surfaces in a direction parallel to said dividing line by an amount to provide one-half the stereoscopic dissimilarity between said stereoscopically dissimilar image pairs, said laterally displaced plane objective reflecting surface being positioned to receive all the light beams rotated in the same angular direction by said two plane reflecting surfaces and rotate each light beam 90° oppositely to the angle of rotation imparted by said two plane reflecting surfaces about a line perpendicular to said plane containing said imaginary dividing line and perpendicular to the film; said plurality of reflecting surfaces comprising additionally a laterally displaced objective roof reflector comprising two plane reflecting surfaces perpendicular to each other and having a line of intersection in the plane containing said imaginary dividing line and perpendicular to the film, said laterally displaced objective roof reflector being displaced laterally from said two plane reflecting surfaces in a direction parallel to the said imaginary dividing line and opposite to the direction of lateral displacement of said laterally displaced plane objective reflecting surface, the lateral displacement of said laterally displaced objective roof reflector being in an amount to provide one-half the stereoscopic dissimilarity between the said stereoscopically dissimilar image pairs, said laterally displaced objective roof reflector being positioned and configured to receive all the light beams rotated by said two plane reflecting surfaces about a line perpendicular to the plane containing the imaginary dividing line and perpendicular to the film in the same direction with respect to each other but oppositely to the direction of rotation imparted by said two plane reflecting surfaces to all the light beams received by said laterally displaced plane objective reflecting surface said laterally displaced objective roof reflector being oriented to rotate each light beam received through an angle of substantially 90° oppositely to the angle of rotation imparted by said two plane reflecting surfaces about a line perpendicular to said plane containing said imaginary dividing line and perpendicular to the film, said laterally displaced objective roof reflector additionally causing each received light beam and corresponding image to be inverted symmetrically from one side to the other side of said plane containing said dividing line and perpendicular to the film; an opaque mask located on that side of the plurality of reflecting surfaces away from the image forming means and adapted to absorb or deflect light rays corresponding to those points in each image which would otherwise be superimposed upon each other; and means comprising suitably placed polarizing elements by which predetermined polarization characteristics may be imparted to the light rays corresponding to each of said image pairs.

3. An optical system according to claim 1 in which the optical image forming means is a single lens having an optic axis perpendicular to the imaginary dividing line, said optic axis being located in the plane perpendicular to the film and containing the imaginary dividing line.

4. An optical system according to claim 2 in which the optical image forming means is a single lens having an optic axis perpendicular to the imaginary dividing line, said optic axis being located in the plane perpendicular to the film and containing the imaginary dividing line.

5. An optical system according to claim 1 in which the optical image forming means is a double lens comprising two identical lenses having parallel optic axes perpendicular to the film and located symmetrically on either side of the plane perpendicular to the film and containing the imaginary dividing line.

6. An optical system according to claim 2 in which the optical image forming means is a double lens comprising two identical lenses having parallel optic axes perpendicular to the film and located symmetrically on either side of the plane perpendicular to the film and containing the imaginary dividing line.

7. An optical system for forming on a film or projecting into stereoscopic coincidence from a film stereoscopically dissimilar image pairs inverted with respect to each other about an imaginary line located in the film and in a plane perpendicular to the film which plane contains the line along which may be measured the distance between elements in the system which determines the amount of stereoscopic dissimilarity in the image pairs; comprising a film gate; optical image forming means positioned with respect to the film to form or project said image pairs; a plurality of reflecting surfaces located on that side of the said optical image forming means away from said film gate comprising two plane reflecting surfaces the planes of which are each perpendicular to the other and each perpendicular to the plane containing said imaginary dividing line and perpendicular to the film, said two plane reflecting surfaces being each at an angle of 45° to the plane of the film and having positions and configurations to receive beams of light corresponding to each point in the said image pairs, divide the light in each beam approximately in half, and rotate the two halves of each beam oppositely through angles of 90° about a line perpendicular to said plane containing the imaginary dividing line and perpendicular to the film; said plurality of reflecting surfaces comprising additionally means providing a laterally displaced plane objective reflecting surface the plane of which is perpendicular to the plane containing said imaginary dividing line and perpendicular to the film, said laterally displaced plane objective reflecting surface being displaced laterally from said two plane reflecting surfaces in a direction parallel to said dividing line by an amount to provide one-half the stereoscopic dissimilarity between said stereoscopically dissimilar image pairs, said laterally displaced plane objective reflecting surface being positioned to receive all the said half-beams rotated in the same direction by said two reflecting surfaces and rotate each half-beam received 90° oppositely to the angle of rotation imparted by said two plane reflecting surfaces about a line perpendicular to said plane containing said imaginary dividing line and perpendicular to the film; said plurality of reflecting surfaces comprising additionally a laterally displaced objective roof reflector comprising two plane reflecting surfaces perpendicular to each other and having a line of intersection in the plane containing said imaginary dividing line and perpendicular to the film, said laterally displaced objective roof reflector being displaced laterally from said two plane reflecting surfaces in a direction parallel to the said imaginary dividing line and oppositely to the direction of lateral displacement of said laterally displaced plane objective reflecting surface, the lateral displacement of said laterally displaced objective roof reflector being in an amount to provide one-half the stereoscopic dissimilarity between the said stereoscopically dissimilar image pairs, said laterally displaced objective roof reflector being positioned and configured to receive all the half-beams rotated by said two plane reflecting surfaces about a line perpendicular to the plane containing the imaginary dividing line and perpendicular to the film in the same direction with respect to each other but oppositely to the direction of rotation imparted by said two plane reflecting surfaces to all the half-beams received by said laterally displaced plane objective reflecting surface said laterally displaced objective roof reflector being oriented to rotate each half-beam received through an angle of substantially 90° oppositely to the angle of rotation imparted by said two plane reflecting surfaces about a line perpendicular to said plane containing said imaginary dividing line and perpendicular to the film, said laterally displaced objective roof reflector additionally causing each received half-beam and corresponding image to be inverted symmetrically from one side to the other side of said plane containing said dividing line and perpendicular to the film; a mask positioned on that side of the plurality of reflecting surfaces away from the image forming means having one edge straight and parallel to said plane containing said imaginary dividing line and perpendicular to the film said mask being opaque on one side of the edge and located to prevent superposition of inverted images upon each other at each focal plane of said image forming means; and means comprising suitably placed polarizing elements by which predetermined polarization characteristics may be imparted to the light beams corresponding to each of said image pairs.

8. An optical system according to claim 7 in which the optical image forming means comprises a single lens having an optic axis perpendicular to the imaginary dividing line, said optic axis being located in the plane perpendicular to the film and containing the imaginary dividing line, in which the two plane reflecting surfaces comprise a partially-transmitting partially-reflecting plane surface located adjacent to the single lens and a centrally located plane totally-reflecting surface located on that side of the partially-transmitting partially-reflecting plane surface away from the lens, and in which the mask edge is located in plane perpendicular to the film and containing the imaginary dividing line.

9. An optical system according to claim 7 in which the optical image forming means comprises a double lens comprising two identical lenses having parallel optic axes perpendicular to the film and located symmetrically on either side of the plane perpendicular to the film and containing the imaginary dividing line, and in which the two plane reflecting surfaces comprise a partially-transmitting partially-reflecting plane surface located adjacent to the double lens and a centrally located plane totally-reflecting surface located on that side of the partially-transmitting partially-reflecting plane surface away from the double lens.

10. An optical system according to claim 7 in which the optical image forming means is a single lens having an optic axis perpendicular to the imaginary dividing line, said optic axis being located in the plane perpendicular to the film and containing the imaginary dividing line, and in which the two plane reflecting surfaces comprise two centrally located plane reflecting surfaces the planes of which intersect in a line intersecting said optic axis, said two centrally located plane reflecting surfaces extending oppositely each on one side only of said plane containing said imaginary dividing line and said optic axis.

11. An optical system according to claim 2 in which the optical image forming means comprises a double lens comprising two identical lenses having parallel optic axes perpendicular to the film and located symmetrically on either side of the plane perpendicular to the film and containing the imaginary dividing line, and in which the two plane reflecting surfaces comprise two centrally located plane reflecting surfaces the planes of which intersect in a line intersecting said optic axes, said two centrally located plane reflecting surfaces extending oppositely each on one side only of said plane containing said imaginary dividing line and perpendicular to the film.

12. An optical system for use with a camera or projector comprising a film gate in which the plane of the film is vertical, an objective lens with its optic axis horizontal and perpendicular to the plane of said film and positioned along its optic axis so as to transmit light rays to or from a plurality of images within the film plane of said film gate; said optical system including a plane partially-transmitting partially-reflecting surface positioned on that side of said objective lens away from said film gate, said plane partially-transmitting partially-reflecting surface positioned to contain a vertical axis intersecting the optic axis of said objective lens and angularly positioned about said contained vertical axis such that rotation of said plane partially-transmitting partially-reflecting surface through an angle of approximately 45° counterclockwise looking downward is necessary to achieve coincidence with the optic axis of said objective lens; a plane totally-reflecting objective surface positioned vertically and substantitally parallel to said plane partially-transmitting partially-reflecting surface, said plane totally-reflecting objective surface displaced laterally from said plane partially-transmitting partially-reflecting surface by an amount equal to one-half the desired interocular spacing and in a direction such that a light ray travelling along the optic axis of said objective lens towards said plane partially-transmitting partially-reflecting surface will be reflected in a direction to be again reflected by said plane totally-reflecting objective surface; a plane totally-reflecting surface positioned on that side of said objective lens away from said film gate and on that side of said plane partially-transmitting partially-reflecting surface away from said objective lens, said plane totally-reflecting surface positioned to contain a vertical axis intersecting the optic axis of said objective lens and angularly positioned about said contained vertical axis such that rotation of said plane totally-reflecting surface through an angle of approximately 45° clockwise looking downward is necessary to achieve coincidence with the optic axis of said objective lens; a combination of two totally-reflecting plane inverting roof objective surfaces positioned to intersect perpendicularly in a horizontal line contained in the same horizontal plane as the optic axis of said objective lens and positioned angularly about said horizontal line of intersection so as to be symmetrically disposed on either side of the horizontal plane containing said line of intersection and said optic axis of said objective lens, said combination of two totally-reflecting plane roof objective inverting surfaces positioned with the said line of intersection comprising the roof apex substantially parallel to the plane of said plane totally-reflecting surface and displaced laterally from said plane totally-reflecting surface by an amount equal to one-half the interocular spacing in the opposite direction from the direction of said plane totally-reflecting objective surface lateral displacement from said objective lens optic axis, said combination of two totally-reflecting plane roof objective inverting surfaces so positioned that the plane of said plane totally-reflecting surfaces lies within the cylindrical quadrant formed by the two totally-reflecting plane roof objective inverting surfaces; a mask positioned on that side of all the optical system reflecting surfaces away from said objective lens and having its upper edge horizontal and intersecting perpendicularly the said optic axis; means providing suitable prisms or transparent plates to form the physical support for the surfaces described herein; means providing a base on which the optical elements, mask and camera or projector are mounted; means comprising suitable cement for fixing firmly said optical elements in place with respect to each other and to the said base; and means comprising suitably placed polarizing elements by which predetermined polarization characteristics may be imparted to the light rays representing the left and right stereoscopic images.

13. An optical system for use with a camera or projector comprising a film gate in which the plane of the film is vertical, an objective lens with its optic axis horizontal and perpendicular to the plane of said film and positioned along its optic axis so as to transmit light rays to or from a plurality of images within the film plane of said film gate; and said optical system comprising a pair of plane totally-reflecting surfaces positioned on that side of said objective lens away from said film gate, both of said plane totally-reflecting surfaces positioned to contain a single vertical axis intersecting perpendicularly the optic axis of said objective lens, one of said plane totally-reflecting surfaces extending only in a direction upwards from a horizontal plane containing the optic axis of said objective lens and positioned about said contained vertical axis such that rotation through an angle of approximately 45° counterclockwise looking downward is necessary to achieve coincidence with the optic axis of said objective lens, the other of said pair of plane totally-reflecting surfaces extending only in a direction downwards from a horizontal plane containing the optic axis of said objective lens and positioned such that rotation through an angle of approximately 45° clockwise looking downward about said contained vertical axis is necessary to achieve coincidence with the optic axis of said objective lens; a plane totally-reflecting objective surface positioned vertically and substantially parallel to that one of said pair of plane totally-reflecting surfaces which extends only in a direction upwards from the said horizontal plane containing the optic axis of said objective lens, said plane totally-reflecting objective surface displaced laterally from said vertical axis by an amount equal to one-half the desired interocular spacing; and in a direction such that a light ray travelling parallel to but slightly above the optic axis of said objective lens toward that one of said pair of plane totally-reflecting surfaces which extends only in a direction upward from the said horizontal plane containing the optic axis of said objective lens will be reflected toward and again reflected from said plane totally-reflecting objective surface; a combination of two totally-reflecting plane roof objective inverting surfaces positioned to intersect perpendicularly in a horizontal line and positioned angularly about said horizontal line of intersection so as to be symmetrically disposed on either side of a horizontal plane containing said line of intersection and said optic axis of said objective lens, said combination of two totally-reflecting plane roof objective inverting surfaces positioned with the said line of intersection comprising the roof apex substantially parallel to that one of said pair of totally-reflecting surfaces which extends only in a direction downward from the said horizontal plane containing the optic axis of said objective lens, said combination of two totally-reflecting plane roof objective inverting surfaces displaced laterally from said vertical axis by an amount equal to one-half the interocular spacing in the opposite direction from the direction of said plane totally-reflecting objective surface lateral displacement from said vertical axis, said combination of two totally-reflecting plane roof objective inverting surfaces so positioned that the plane of that one of said pair of plane totally-reflecting surfaces which extends only in a direction downward from the said horizontal plane containing the optic axis of said objective lens lies within the cylindrical quadrant formed by the two totally-reflecting plane roof objective inverting surfaces; a mask positioned on that side of all the optical system reflecting surfaces away from said objective lens and having its upper edge horizontal and intersecting perpendicularly the said optic axis; means providing suitable prisms or transparent plates to form the physical support for the surfaces described herein; means providing a base on which the optical elements, mask, and camera or projector are mounted; means comprising suitable cement for fixing firmly said optical elements in place with respect to each other and to the said base; means comprising suitably placed polarizing elements by which predetermined polarization characteristics may be imparted to the light rays representing the left and right stereoscopic images.

References Cited in the file of this patent

UNITED STATES PATENTS

| | | |
|---|---|---|
| 2,212,880 | Land | Aug. 27, 1940 |
| 2,313,561 | Mainardi et al. | Mar. 9, 1943 |

FOREIGN PATENTS

| | | |
|---|---|---|
| 385,623 | Great Britain | Jan. 2, 1933 |